Nov. 9, 1948.          B. C. PETERS                2,453,261
                   TOPOGRAPHY PLOTTING DEVICE
Filed April 11, 1947                          2 Sheets-Sheet 1

Inventor
Burnis C. Peters

By Clarence A. O'Brien
and Harvey B. Jacobson
Attorneys

Nov. 9, 1948.                B. C. PETERS                2,453,261
                      TOPOGRAPHY PLOTTING DEVICE
Filed April 11, 1947                              2 Sheets-Sheet 2
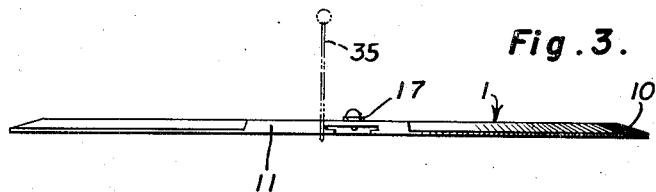
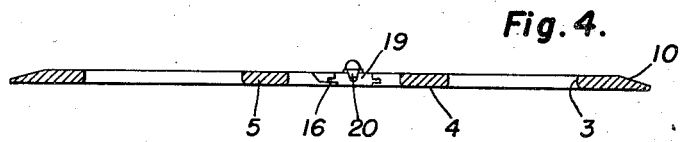
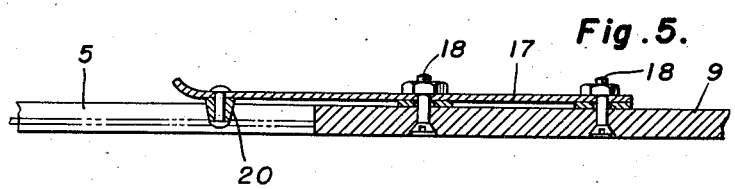
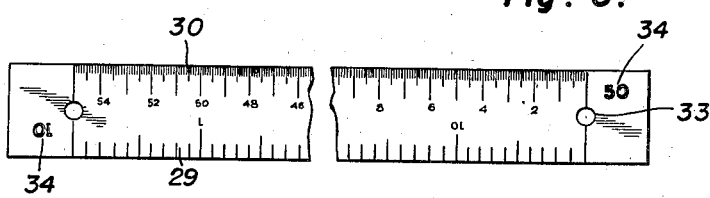
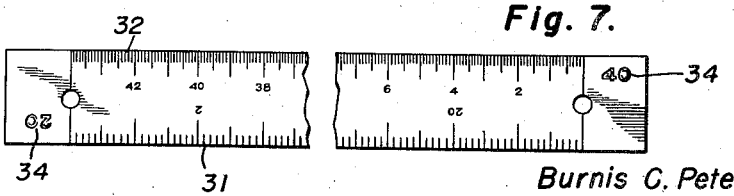
Inventor
Burnis C. Peters Patented Nov. 9, 1948

2,453,261

UNITED STATES PATENT OFFICE 2,453,261

TOPOGRAPHY PLOTTING DEVICE

Burnis C. Peters, Giddings, Tex.

Application April 11, 1947, Serial No. 740,787

3 Claims. (Cl. 33—75)

My invention relates to improvements in topography plotting devices, the primary object in view being to provide a small device which can be taken out into the field, for instance in a pocket, and used on a sketching board, or drafting table, to plot transit notes, locating points by angles, azimuth and distance, and by means of which such work can be accomplished in a quicker easier manner than with the conventional protractor and engineer's scale.

Other and subordinate objects, also comprehended by my invention, together with the precise nature of my improvements, and the advantages thereof will be readily understood when the succeeding description and claims are read with reference to the drawings accompanying and forming part of this specification.

In said drawings:

Figure 3 is a view in edge elevation of the protractor head;

Figure 4 is a view in transverse section taken on the line 4—4 of Figure 2;

Figure 5 is a fragmentary view in transverse section taken on the line 5—5 of Figure 2 and drawn to a larger scale;

Figures 6 and 7 are views in plan of the scale bar showing the relatively reverse faces thereof and the different scales thereon respectively, and drawn to a larger scale.

Figure 1:
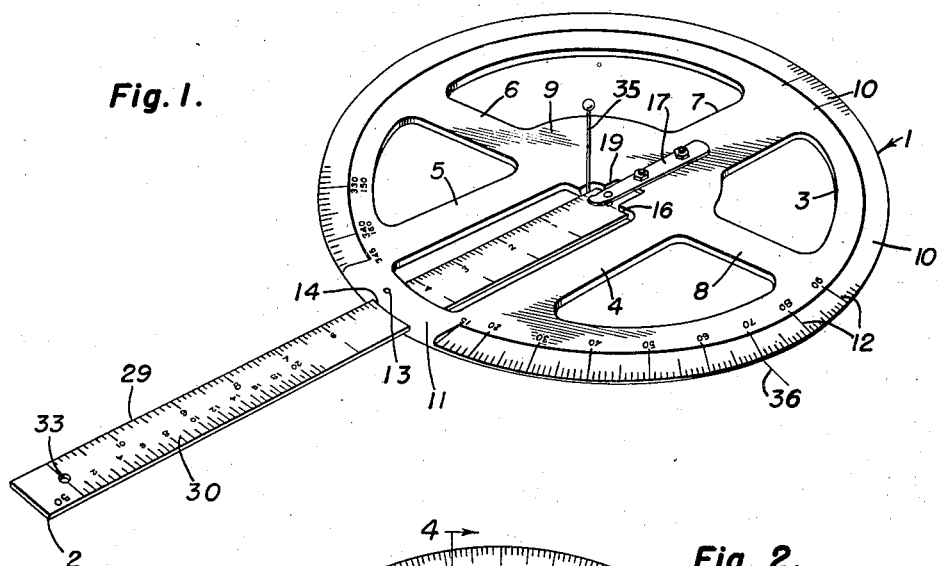
Figure 1 is a view in perspective of my improved topography plotting device in a preferred embodiment thereof.
Figure 2:
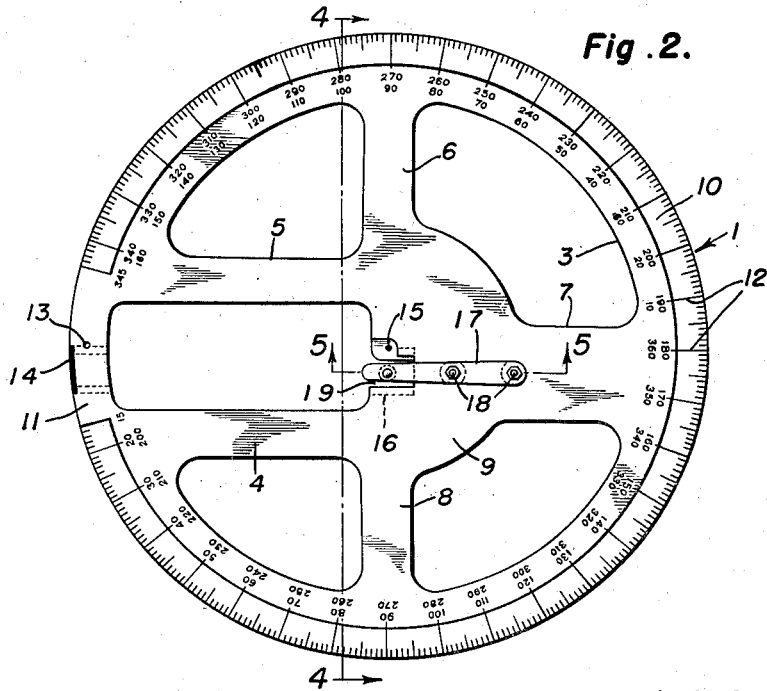
Figure 2 is a view in plan of the protractor head with the scale bar detached.

Referring now to the drawings by numerals, my improved plotting device comprises a protractor head 1, preferably formed of transparent plastic, and an opaque scale bar 2 preferably formed of stainless steel, both of which will now be described in detail.

The protractor head, which may be of any suitable size for carrying, is of circular thin form and flat, with the exceptions presently noted, and with a rim portion 3 formed integrally with internal spider arms 4, 5, 6, 7, 8 extending from a hub portion 9. A beveled edge portion 10 is provided on the rim portion 3 with an interposed edge segment 11 transversely rounded on top outwardly and downwardly to reinforce the same for a purpose presently seen, and from opposite ends of which a pair 4, 5 of the spider arms extend parallel with the diameter of said head 1, also for reinforcing purposes.

The rim portion 3 is divided into degrees of a circle with degree marks 12, and unit degree marks, scribed on the bottom of the same beneath the beveled edge portion 10, said degree marks 12 being numbered on top of the rim portion 3 from "15 to 345" starting an appropriate distance from one side of a center zero mark 13 on top of the sector 11 and ascending in order in one direction around said portion 3 with the "180" degree mark so numbered diametrically opposite the zero mark 13. These numbers, together with the degree marks 12, and unit degree marks, comprise a primary protractor scale.

Within the described primary protractor scale, the degree marks are numbered in ascending order, in the same direction as in the primary scale, and beginning with "10" and ending with "360" at the "180" degree mark of said primary scale. This numbering comprises a secondary protractor scale. As will be observed, both the primary and the secondary protractor scales are broken by the segment 11, with the exception of the zero mark 13, the purpose of which will presently appear.

A dovetail slot 14 is provided in the segment 11 with one side edge vertically aligned with the zero mark 13. A pin hole 15 is formed in the hub 9 in the axis of the head 1. An edge slot 16, similar to the slot 14 is formed in the hub 9 in alignment with said slot 14 and having a side edge vertically aligned with the pin hole 15. The purpose of the slots 14, 16 and the pin hole 15 will presently be explained.

A leaf spring 17 is bolted, as at 18, to the hub 9 in vertical alignment with said slots 14, 16, and to extend at one end over an edge notch 19 in said hub 9 formed over the slot 16, said end of the leaf spring 17 being provided with a button 20 adapted to depend therefrom into said notch 19. The purpose of the spring 17, notch 19 and button 20 will also presently be explained.

The scale bar 2 adapted to be slid endwise into the head 1 through the slot 14, and between the spider arms 4, 5 with one end fitted in the slot 16, the described arrangement of the slots 14, 16 providing for locating one side edge of said scale bar 2 radially of said head and in diametrical alignment with the zero mark 13 and the "180" degree mark 12 of the primary scale, which is also "360" degree mark of the secondary scale. The scale bar 2 has scribed thereon along the side edges thereof different scales 29, 30, 31, 32 calibrated in units of feet, all arranged in ascending order from zero at one or the other end of said bar and with the scales on each face reversed relatively so that said scale bar may be reversed end for end and face for face and slid into head 1 to bring a selected one of the scales 29 to 32 in alignment with the zero mark 13 with the selected scale reading in ascending order outwardly of said head 1, which is the reading position of the selected one of said scales. End apertures 33 in scale bar 2 are provided for snap action engagement with the button 20 to lock the scale bar 2 in said head 1 in a position in which the zero of the selected scale 29 to 32 is opposite the pin hole 15 in the axis of the head 1. The scales 29 to 32 may be designated on the ends of the scale bar 2, as at 34, according to the units of feet represented by the graduations of the scale.

As will be apparent, by having the segment 11 interrupting the primary and secondary protractor scales on the head 1, that is being unmarked with the exception of the zero mark 13, the scale bar 2 can be read through said sector without confusion.

As explanatory of the manner in which the described device may be used in plotting notes in connection with a transit, the following example is given.

To plot azimuth 70°, distance 800 feet, the device is placed on a sheet of paper, not shown, and a pin 35 is inserted through the pin hole 15 into the paper to provide a fixed center and represent the location of the transit. A radial line 36 is drawn on the paper at the zero mark 13 and reading edge of the selected scale 29 to 32, outwardly of the head 1, to represent the line of sight of the transit, when the vernier of the transit was set on zero. The device is next rotated about the pin 35 until the "70" degree mark 12 on the primary scale of the head 1 registers with the line 36, this brings the reading edge of the scale bar 2 pointed in the same direction as the line of sight of the transit when the shot was taken so that "800" feet can be scaled on the selected scale of the scale bar 2. Any angle which falls between "15" degrees and "345" degrees, that is through the sector 11, should be located by using the secondary protractor scale on the head 1 with the point at "180" degrees azimuth.

The foregoing will, it is believed, suffice to impart a clear understanding of my invention, without further explanation.

Manifestly, the invention, as described, is susceptible of modification, without departing from the inventive concept and right is herein reserved to such modifications as fall within the scope of the appended claims.

What I claim is:

1. In a device of the class described, a transparent circular protractor head having a marginal scale in degrees of a circle and an axial hole therein for receiving a center pin whereby said head is adapted to be revolved into different angular positions about said pin, said head having a transparent marginal segment interrupting said scale and provided with an opening and a zero mark for said scale, and a scale bar extending endwise through said opening in a plane parallel to that of said head and having different side edge face scales thereon adapted to be read in part through said segment and for plotting distances in different units of measurement in different angular positions of said head, said scale bar being removable and reversible end for end and face for face for replacement in said head to arrange the scales thereon, selectively, in line with said zero mark and with zero of the selected scale in the axis of said head.

2. In a device of the class described, a transparent circular protractor head having a marginal scale in degrees of a circle and an axial hole therein for receiving a center pin whereby said head is adapted to be revolved into different angular positions about said pin, said head having a transparent marginal segment interrupting said scale and provided with an opening and a zero mark for said scale, and a scale bar extending endwise through said opening in a plane parallel to that of said head and having different side edge face scales thereon adapted to be read in part through said segment and for plotting distances in different units of measurement in different angular positions of said head, said scale bar being removable and reversible end for end and face for face for replacement in said head to arrange the scales thereon, selectively, in line with said zero mark and with zero of the selected scale in the axis of said head, said head having a second scale thereon for optional use in finding angles extending through said sector.

3. In a device of the class described, a transparent circular protractor head having a marginal scale in degrees of a circle and axial hole therein for receiving a center pin whereby said head is adapted to be revolved into different angular positions about said pin, said head having a transparent marginal segment interrupting said scale and provided with an opening and a zero mark for said scale, and a scale bar extending endwise through said opening in a plane parallel to that of said head and having different side edge face scales thereon adapted to be read in part through said segment and for plotting distances in different units of measurement in different angular positions of said head, said scale bar being removable and reversible end for end and face for face for replacement in said head to arrange the scales thereon, selectively, in line with said zero mark and with zero of the selected scale in the axis of said head, and snap action means for securing said scale bar in said head.

BURNIS C. PETERS.

REFERENCES CITED

The following references are of record in the file of this patent:

UNITED STATES PATENTS

| Number | Name | Date |
|---|---|---|
| 713,255 | Traut | Nov. 11, 1902 |
| 1,113,717 | Thayer | Oct. 13, 1914 |
| 1,193,801 | Lefebvre | Aug. 8, 1916 |
| 1,375,649 | Clark | Apr. 19, 1921 |
| 1,524,730 | Cain | Feb. 3, 1925 |